United States Patent [19]
McClellan

[11] 3,764,989
[45] Oct. 9, 1973

[54] DATA SAMPLING APPARATUS

[75] Inventor: Ronald E. McClellan, Cinnaminson, N.J.

[73] Assignee: Ultronic Systems, Inc., Moorestown, N.J.

[22] Filed: Dec. 20, 1972

[21] Appl. No.: 316,701

[52] U.S. Cl. .................... 340/172.5, 178/50, 179/15
[51] Int. Cl. ........................ G06k 7/016, G08c 19/24
[58] Field of Search ............... 340/172.5, 146.1 AL, 340/173 AM, 173 RC, 174 SR; 178/50; 179/15 BA, 15 BS, 15 BY; 235/156, 168

[56] References Cited

UNITED STATES PATENTS

| | | | |
|---|---|---|---|
| 3,710,327 | 1/1973 | Books et al. | 340/172.5 |
| 3,685,021 | 8/1972 | Mauch | 340/146.1 |
| 3,681,764 | 8/1972 | Conant | 340/173 AM |
| 3,676,862 | 7/1972 | Sasabe | 179/15 BY |
| 3,646,526 | 2/1972 | Fagan et al. | 340/173 RC |
| 3,646,520 | 2/1972 | Spencer | 340/172.5 |
| 3,636,524 | 1/1972 | Holland | 179/15 BA |
| 3,413,454 | 11/1968 | Frankel | 235/176 |
| 3,368,203 | 2/1968 | Loizides | 340/172.5 |
| 3,288,928 | 11/1966 | Bartlett et al. | 178/50 |
| 3,229,259 | 1/1966 | Barker et al. | 340/172.5 |

*Primary Examiner*—Gareth D. Shaw
*Assistant Examiner*—Jan E. Rhoads
*Attorney*—Norman J. O'Malley et al.

[57] ABSTRACT

Data sampling apparatus for sampling and storing the values of bits included in a plurality of binary coded signals applied to a corresponding plurality of input data lines. The binary coded signals are sampled repetitively and sequentially by a multiplexer unit and the sampled signals, each having a value of "0" or "1," are applied to and stored in succession in a first plurality of shift registers. The shift registers are arranged to store a set, for example, four, of the most recent sampled signals derived from each of the binary coded signals. The sampled signals are examined at outputs of the shift registers by a mark-to-space detector to detect a set of the most recent sampled signals having particular values (e.g., 1100) indicating that a mark-to-space transition has occurred in a binary coded signal. At such time as this set of sampled signals is detected by the mark-to-space detector, a counter arrangement, including a second plurality of shift registers, is operated to provide successive binary counts at the outputs of the registers for the duration of the bit period following the detection of the aforesaid set of sampled signals. One of these binary counts, for example, a binary count of 15, is taken to represent the center of a bit period following a mark-to-space transition detected by the mark-to-space detector, and another of the binary counts, for example, a binary count of 31, is taken to represent the end of the bit period. Each binary count representing the center of a bit period is detected by a center-of-bit detector at which time a sampled signal representing the value of the bit in the bit period is transferred from the output of a selected one of the first plurality of shift registers to a bit value shift register. Each binary count representing the end of a bit is detected by an end-of-bit detector as a result of which the counting sequence for the bit period is determined and a new counting sequence is initiated for the next bit period.

20 Claims, 2 Drawing Figures

DATA SAMPLING APPARATUS

BACKGROUND OF THE INVENTION

The present invention relates to data sampling apparatus and, more particularly, to a data sampling apparatus for sampling and storing the values of bits in binary coded signals present on a plurality of input data lines.

It is often desired to sample binary coded signals to determine the value of each bit thereof and to store the value of each of the sampled bits in a storage unit for subsequent use by output data processing circuitry. One common approach which has been used heretofore to sample the bit values of a binary coded signal has been to detect each transition in the signal from one level to another level, specifically, from a mark ("1") to a space ("0") and from a space to a mark, and after detecting each transition, to trigger a center pulse sampling circuit, typically including a conventional binary counter, to sample the value of the bit in the center of the following bit period. Generally, a particular binary count of the binary counter is used to represent the center of each bit period, this binary count then being decoded to initiate the sampling of the value of the bit at the center of the bit period. The value of each sampled bit is applied to and stored in a storage unit (e.g., a storage shift register) and subsequently used by associated output data processing circuitry.

While the above data sampling approach is satisfactory for many data processing applications, if it is desired to sample binary coded signals present on several data lines, it is necessary to provide a transition detection circuit, a binary counter, and a decoding circuit for each data line to achieve the desired sampling of the binary coded signals. This multiplication of circuits generally leads to high cost and is therefore to be avoided wherever possible.

BRIEF SUMMARY OF THE INVENTION

Briefly, in accordance with the present invention, a data sampling apparatus is provided which avoid the shortcomings and disadvantages associated with the aforedescribed prior art arrangement. The data sampling apparatus includes a first means having a plurality of input connections for receiving a plurality of binary coded signals. These binary coded signals comprise bits, each having a first value or a second value, present in corresponding bit periods of the binary coded signals. The first means operates to sample the bits in the bit periods of the binary coded signals received at its input connections whereby sampled signals, each having a first value or a second value, are derived from the binary coded signals. The first means also produces a transition output signal for each transition in each binary coded signal from one of its bit values to the other of its bit values.

A counting means coupled to the first means operates in response to a transition output signal produced by the first means to count through a predetermined sequence of counts. The counting means includes a plurality of shift register means and a logic means. The plurality of shift register means each have an input connection and an output connection. The input connection of the first one of the plurality of shift register means is coupled to the first means, and the output connection of each of the plurality of shift register means, with the exception of the last one of the plurality of shift register means, is coupled to the input connection of the next shift register means. The abovementioned logic means is coupled to the plurality of shift register means and to the first means and operates when a transition output signal is produced by the first means to establish a counting mode of operation for the plurality of shift register means whereby successive combinations of output signals, corresponding to the samples of the bit present in the bit period following the transition for which the transition output signal is produced by the first means, are caused to be established at the output connections of the plurality of shift register means. These combinations of output signals represent different counts. One of the counts represents a particular point, for example, the center, of each bit period following a transition for which a transition output signal is produced by the first means.

A detector means is coupled to the output connections of the plurality of shift register means and is adapted to examine the counts established at the output connections of the plurality of shift register means. The detector means operates in response to detecting a count representing the aforesaid particular point in a bit period following a transition for which a transition output signal is produced by the first means to produce a corresponding output signal. An output means coupled to the detector means and to the first means operates in response to an output signal produced by the detector means corresponding to a count representing the aforesaid point in a bit period to receive and store a sampled signal from the first means representing the value of the bit in the bit period.

BRIEF DESCRIPTION OF THE DRAWING

Various objects, features, and advantages of a data sampling apparatus in accordance with the present invention will be apparent from the following detailed discussion together with the accompanying drawing in which.

DETAILED DESCRIPTION OF THE INVENTION

General Description

Figures 1, 2:
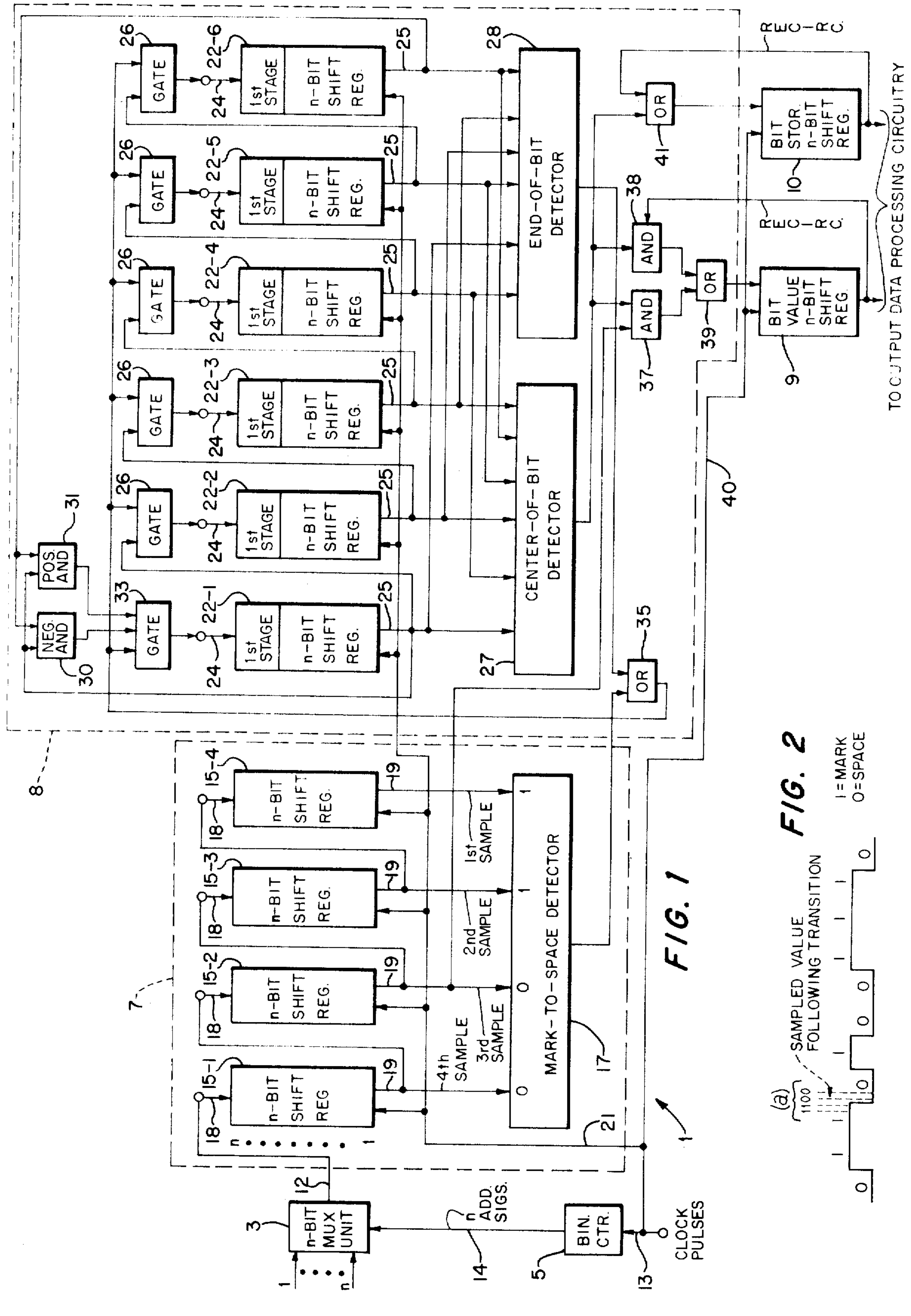
FIG. 1 is a schematic block diagram of a data sampling apparatus in accordance with the present invention.
FIG. 2 illustrates the waveform of a typical binary coded signal present on an input data line of the data sampling apparatus of FIG. 1.

Referring now to FIG. 1, there is shown in schematic block diagram form a data sampling apparatus 1 in accordance with the present invention. The data sampling apparatus 1 generally includes an *n*-bit multiplexer unit 3, a binary counter 5, a sample storage and transition detector circuit 7, a counter center-pulse sampling circuit 8, a bit value *n*-bit shift register 9, and a bit storage *n*-bit shift register 10. The *n*-bit multiplexer unit 3 includes a plurality of input data lines 1 . . . *n* and an output connection 12 coupled to the sample storage and transition detector circuit 7. Binary coded signals the bit values of which are to be sampled by the data sampling apparatus 1 are applied to the input data lines 1 . . . *n* of the *n*-bit multiplexer unit 3. The waveform of a typical one of these binary coded signals is shown in FIG. 2. The binary counter 5 includes an input connection 13 and an output connection 14 coupled to the *n*-bit multiplexer 3. The binary counter 5 is arranged to count, in a binary fashion, the clock pulses of a clock pulse train applied to its input connection 13 and to produce a plurality of successive binary coded address signals at its output connection 14. The *n*-bit multiplexer unit 3 operates in response to the successive binary coded address signals produced by the binary counter 5 to repeatedly sample the binary coded signals applied to its input data lines 1 . . . *n* in succession and to apply the sampled signals to its output connection 12, one sampled signal being derived from each of the binary coded signals applied to the *n*-input data lines.

The sample storage and transition detector circuit 7 of the invention includes a plurality of *n*-bit shift registers 15-1 . . . 15-4 and a mark-to-space detector 17. As shown in FIG. 1, each of the *n*-bit shift registers 15-1 . . . 15-4 has an input connection 18 and an output connection 19. The input connection 18 of the first *n*-bit shift register 15-1 is connected to the output connection 12 of the *n*-bit multiplexer unit 3 and its output connection 19 is connected to the input connection 18 of the second *n*-bit shift register 15-2 and also to the mark-to-space detector 17. In a similar manner, the output connection 19 of the second *n*-bit shift register 15-2 is connected to the input connection 18 of the third *n*-bit shift register 15-3 and to the mark-to-space detector 17; the output connection 19 of the third *n*-bit shift register 15-3 is connected to the input connection 18 of the fourth *n*-bit shift register 15-4 and to the mark-to-space detector 17; and the output connection 19 of the fourth *n*-bit shift register 15-4 is connected to the mark-to-space detector 17. The *n*-bit shift registers 15-1 . . . 15-4, like the binary counter 5, are clocked by means of the clock pulses in the aforementioned clock pulse train, these clock pulses being applied in common to the *n*-bit shift registers 15-1 . . . 15-4 over a control line 21. As will be described in detail hereinafter, the four *n*-bit shift registers 15-1 . . . 15-4 operate to store the four most recent sampled signals derived from each of the binary coded signals present on the input data lines 1 . . . *n* of the *n*-bit multiplexer unit 3. The mark-to-space detector 17 operates to detect specific bit values of these sampled signals indicating the occurrence of transitions in the binary coded signals, specifically, mark-to-space ("1" to "0") transitions. The *n*-bit shift registers 15-1 . . . 15-4 are preferably of the MOS type.

The counter center-pulse sampling circuit 8 of the invention includes a plurality of *n*-bit shift registers 22-1 . . . 22-6. Typically, these registers are of the same type as the aforementioned *n*-bit shift registers 15-1 . . . 15-4. As shown in FIG. 1, each of the *n*-bit shift registers 22-1 . . . 22-6 has an input connection 24 and an output connection 25. Each of the output connections 25 of the *n*-bit shift registers 22-1 . . . 22-6, with the exception of the last *n*-bit shift register 22-6, is coupled to the input connection 24 of the next *n*-bit shift register through a gate 26. The gate 26 may be a ground-type OR gate or a positive AND gate. Each of the output connections 25 of the *n*-bit shift registers 22-1 . . . 22-6 is also connected to a center-of-bit detector 27 and to an end-of-bit detector 28. In addition to the above connections, the output connection 25 of the last *n*-bit shift register 22-6 is connected in common to a first input of a negative AND gate 30 and a first input of a positive AND gate 31, and the output connection 25 of the first *n*-bit shift register 22-1 is connected in common to second inputs of the AND gates 30 and 31. The outputs of the AND gates 30 and 31 are coupled through a gate 33, which may also be a ground-type OR gate or a positive AND gate, to the input connection 24 of the first *n*-bit shift register 22-1. As will be described in greater detail hereinafter, the AND gates 30 and 31 and the gate 33 represent an exclusive-or arrangement which is used in establishing a binary counting mode of operation for the *n*-bit shift registers 22-1 . . . 22-6 whereby several different binary counts are established at the output connections 25 of these registers. The various binary counts established at the output connections 25 of the n-bit shift registers 22-1 . . . 22-6 are examined by the center-of-bit detector 27 and by the end-of-bit detector 28, following the detection of a mark to space transition by the mark-to-space detector 17, to detect specific counts representing the center and end, respectively, of a bit period following the mark-to-space transition. The *n*-bit shift registers 22-1 . . . 22-6, like the *n*-bit shift registers 15-1 . . . 15-4, are clocked by means of clock pulses applied to the aforementioned control line 21.

The counter center-pulse sampling circuit 8 further includes an OR gate 35. The OR gate 35 is connected at a first input thereof to the mark-to-space detector 17 and at a second input thereof to the end-of-bit detector 28. The output of the OR gate 35 is connected in common to a third input of the gate 33 and to second inputs of the gates 26. As will be described in greater detail hereinafter, at such time as a mark-to-space transition is detected in a binary coded signal by the mark-to-space detector 17 or, alternatively, a binary count representing the end of a bit period is detected at the output connections 25 of the *n*-bit shift registers 22-1 . . . 22-6, an output signal is produced by the OR gate 35 for resetting the first stages, or positions, of the *n*-bit shift registers 22-1 . . . 22-6 to their "0" states via the associated gates 33 and 26. This resetting operation starts a new sequence of counting operations by the *n*-bit shift registers 22-1 . . . 22-6.

The counter center-pulse sampling circuit 8 also includes a pair of AND gates 37 and 38, an OR gate 39, and an OR gate 41. The AND gate 37 is connected at a first input thereof to the center-of-bit detector 27 and at a second input thereof to the *n*-bit shift register 15-2. The output of the AND gate 37 is connected to the input of the aforementioned bit value *n*-bit shift register 9 through the OR gate 39. The AND gate 38 is connected at a first input thereof to the center-of-bit detector 27 and at a second input thereof to the output of the bit value *n*-bit shift register 9. The output of the AND gate 38 is coupled via the OR gate 39 to the input of the bit value *n*-bit shift register 9. The OR gate 41 is connected at a first input thereof to the center-of-bit detector 27 and at a second input thereof to the output of the aforementioned bit storage *n*-bit shift register 10. The output of the OR gate 41 is connected to the input of the bit storage *n*-bit shift register 10. As will be described in detail hereinafter, at such time as a binary count representing the center of a bit period is detected by the center-of-bit detector 27 at the output connections 25 of the *n*-bit shift registers 22-1 . . . 22-6, a corresponding output signal is produced by the center-of-bit detector 27 and the sampled signal representing the value of the bit in the bit period, which is then present at the output connection 19 of the *n*-bit shift register 15-2, is gated through the AND gate 37 and the OR gate 39 to the input of the bit value *n*-bit shift register 9. This sampled signal is stored by the bit value *n*-bit shift register 9. At the same time as the sampled signal is applied to and stored in the bit value *n*-bit shift register 9, the output signal produced by the center-of-bit detector 27 is coupled through the OR gate 41 into the bit storage *n*-bit shift register 10 and stored by the *n*-bit storage *n*-bit shift register 10. This latter signal serves to indicate that a corresponding sampled signal has been entered into and stored in the bit value *n*-bit shift register 9. The aforementioned AND gate 38 and the OR gates 39 and 41 also provide for recirculation of signals stored in the *n*-bit shift registers 9 and 10 as will be more readily apparent hereinafter. The *n*-bit shift registers 9 and 10 are generally of the same type as the aforedescribed *n*-bit shift registers 15-1 . . . 15-4 and 22-1 . . . 22-6, and are clocked by means of clock pulses applied to a control line 38 coupled thereto.

DETAILED DESCRIPTION OF OPERATION

The operation of the data sampling apparatus 1 of FIG. 1 will now be described in greater detail. For purposes of the following discussion, it will be assumed that 32 binary coded signals are to be processed by the data sampling apparatus 1. Thus, the integer *n* in FIG. 1 has a value of 32. In this case, the binary counter 5 is arranged, for example, by selecting five stages therefor, to provide 32($2^5$) successive binary coded address signals at its output connection 14. Also, each of the *n*-bit shift registers 15-1 . . . 15-4, 22-1 . . . 22-6, 9, and 10 is arranged to have 32 stages, or positions, for storing up to 32 successive bits. A typical data rate for the binary coded signals is 1000 baud and a typical clock pulse frequency is 1 Mhz.

The binary coded signals applied to the 32 input data lines of the *n*-bit multiplexer unit 3 are sampled repeatedly and in succession by the *n*-bit multiplexer unit 3, under control of the binary address signals produced by the binary counter 5, and the sampled signals, each having a binary value of "0" or "1," are applied in succession to the input connection 18 of the first *n*-bit shift register 15-1. These sampled signals are caused to be propagated in series through the several *n*-bit shift registers 15-1 . . . 15-4 by means of clock pulses received thereby over the control line 21. At such time as the four *n*-bit shift registers 15-1 . . . 15-4 are completely filled with sampled signals, four successive sampled signals derived from each of the binary coded signals applied to the input data lines of the *n*-bit multiplexer unit 3 are present in different parallel sets of stages of the four *n*-bit shift registers 15-1 . . . 15-4. Specifically, when the *n*-bit shift registers 15-1 . . . 15-4 are filled with sampled signals, four successive sampled signals derived from the binary coded signal applied to the first input data line of the *n*-bit multiplexer unit 3 are present in the last stages of the four *n*-bit shift registers 15-1 . . . 15-4, four successive sampled signals derived from the binary coded signal applied to the second input data line of the *n*-bit multiplexer unit 3 are present in the next-to-last stages of the four *n*-bit shift registers 15-1 . . . 15-4, etc. With the abovementioned arrangement of sampled signals in the four *n*-bit shift registers 15-1 . . . 15-4, the oldest of each of the four successive sampled signals derived from a binary coded signal is in the last *n*-bit shift register 15-4 and the latest of the four sampled signals is in the first *n*-bit shift register 15-1. The sampled signals stored in the *n*-bit shift registers 15-1 . . . 15-4 are subject to constant change but at any given time the four most recent sampled signals derived from each of the binary coded signals are present in the four *n*-bit shift registers 15-1 . . . 15-4.

As sampled signals are applied to and stored in the four *n*-bit shift registers 15-1 . . . 15-4, the mark-to-space detector 17 operates to continuously examine the output connections 19 of the registers to detect a set of sampled signals having particular binary values indicating that a mark-to-space transition has occurred in a binary coded signal. In accordance with the present invention, a mark-to-space transition is considered to have occurred in a binary coded signal when four successive sampled signals derived from the binary coded signal have values of "1," "1," "0," and "0." Thus, this sequence of values includes at least one "1" sampled signal followed by at least one "0" sampled signal. The above situation is depicted at (*a*) in FIG. 2. Thus, at such time as a "1" sampled signal appears at the output connection 19 of the fourth n-bit shift register 15-4 simultaneously with a "1" sampled signal at the output connection 19 of the third *n*-bit shift register 15-3, a "0" sampled signal at the output connection 19 of the second *n*-bit shift register 15-2, and a "0" sampled signal at the output connection 19 of the first *n*-bit shift register 15-1, the mark-to-space detector 17 detectes this combination of sampled signals and produces a transition output signal which is applied to the OR gate 35. The OR gate 35 operates in response to the output transition signal produced by the mark-to-space detector 17 to reset the first stages of the *n*-bit registers 22-1 . . . 22-6 to their "0" stages via the associated gates 33 and 26.

The six *n*-bit shift registers 22-1 . . . 22-6, together with the AND gates 30 and 31 and the gates 33 and 26, constitute a binary counting arrangement. When a mark-to-space transition is detected in a binary coded signal by the mark-to-space detector 17, successive binary counts are established in the *n*-bit shift registers 22-1 . . . 22-6 at the rate at which the binary coded signal is sampled. Moreover, these counts correspond to the samples of the bit present in the next bit period following the transition. Predetermined ones of the counts following the detection of a transition in a binary coded signal, for example, the binary counts 15 and 31 are selected with respect to the data baud rate to represent the center and end, respectively, of the next bit period following the transition. The binary counting mode of operation of the *n*-bit shift registers 22-1 . . . 22-6 is established in part by the AND gates 30 and 31 and the gate 33 which, as stated hereinbefore, constitute an exclusive-or circuit. Specifically, at such time as the last stage of the first *n*-bit shift register 22-1 and the last stage of the last *n*-bit shift register 22-6 both contain the same valued bit, either a "1" bit or a "0" bit, an output signal is produced by the AND gate 30 or by the AND gate 31. More particularly, an output signal is produced by the AND gate 30 when the two stages both contain "0" bits and an output signal is produced by the AND gate 31 when the two stages both contain "1" bits.

The counting operation of the *n*-bit shift registers 22-1 . . . 22-6 will now be described in greater detail. As mentioned above, when an output signal is produced by the mark-to-space detector 17, in response to detecting a transition in a binary coded signal on one of the input data lines 1 . . . *n*, the first stages of the six *n*-bit shift registers 22-1 . . . 22-6 are reset to their "0" states. As successive clock pulses are applied to the $n$-bit shift registers 22-1 . . . 22-6, specifically, after 32 clock pulses, the zero bits established in the first stages of the $n$-bit shift registers 22-1 . . . 22-6 are caused to appear at the associated output connections 25. The binary count at the output connections 25 of the six $n$-bit shift registers 22-1 . . . 22-6 at this time is therefore 0 0 0 0 0 0. At this time, the last stages of the first and last $n$-bit shift registers 22-1 and 22-6 both contain "0" bits and, as a result, a "1" bit is caused to be entered into the first stage of the first $n$-bit shift register 22-1 by the AND gate 30 and the gate 33. At the same time, the "0" bit at the output connection 25 of the first $n$-bit shift register 22-1 is transferred into the first stage of the second $n$-bit shift register 22-2. After 32 more clock pulses, the "1" bit which was entered into the first stage of the first $n$-bit shift register 22-1 is caused to appear at the output connection 25 of the first $n$-bit shift register 22-1. The binary count at the output connections 25 of the six $n$-bit shift registers 22-1 . . . 22-6 at this time is therefore 1 0 0 0 0 0. The "1" bit at the output connection 25 of the first $n$-bit shift register 22-1 is transferred into the first stage of the second $n$-bit shift register 22-2 and, after 32 more clock pulses, appears at the output connection 25 of the second $n$-bit shift register 22-2. Thus, the binary count at the output connections 25 of the six $n$-bit shift registers 22-1 . . . 22-6 at this time is 0 1 0 0 0 0. The above type of operation continues whereby several "1" bits are caused to be inserted into and propagated along the six $n$-bit shift registers 22-1 . . . 22-6 as a result of which several different combinations of "1" bits and "0" bits, representing different binary counts, are established at the output connections 25 of the six $n$-bit shift registers 22-1 . . . 22-6. Up to 63($2^n-1$) different binary counts are possible with the number (six) of shift registers 22-1 . . . 22-6 shown in FIG. 1. However, for the 1,000 baud data rate used in the present example, only 32 binary counts are used. After the 30-second count, the end-of-bit detector 28 operates to detect this count and to reset the first stages of the registers 22-1 . . . 22-6, as will be described more fully hereinafter. The 32 binary counts which are used in the present example are set forth for convenience in the table hereinbelow. It is to be noted that these counts are not straight binary counts.

Binary Counts At Output Connections 25

| 22-1 | 22-2 | 22-3 | 22-4 | 22-5 | 22-6 | Count |
|---|---|---|---|---|---|---|
| 0 | 0 | 0 | 0 | 0 | 0 | 0 |
| 1 | 0 | 0 | 0 | 0 | 0 | 1 |
| 0 | 1 | 0 | 0 | 0 | 0 | 2 |
| 1 | 0 | 1 | 0 | 0 | 0 | 3 |
| 0 | 1 | 0 | 1 | 0 | 0 | 4 |
| 1 | 0 | 1 | 0 | 1 | 0 | 5 |
| 0 | 1 | 0 | 1 | 0 | 1 | 6 |
| 0 | 0 | 1 | 0 | 1 | 0 | 7 |
| 1 | 0 | 0 | 1 | 0 | 1 | 8 |
| 1 | 1 | 0 | 0 | 1 | 0 | 9 |
| 0 | 1 | 1 | 0 | 0 | 1 | 10 |
| 0 | 0 | 1 | 1 | 0 | 0 | 11 |
| 1 | 0 | 0 | 1 | 1 | 0 | 12 |
| 0 | 1 | 0 | 0 | 1 | 1 | 13 |
| 0 | 0 | 1 | 0 | 0 | 1 | 14 |
| 0 | 0 | 0 | 1 | 0 | 0 | 15 |
| 1 | 0 | 0 | 0 | 1 | 0 | 16 |
| 0 | 1 | 0 | 0 | 0 | 1 | 17 |
| 0 | 0 | 1 | 0 | 0 | 0 | 18 |
| 1 | 0 | 0 | 1 | 0 | 0 | 19 |
| 0 | 1 | 0 | 0 | 1 | 0 | 20 |
| 1 | 0 | 1 | 0 | 0 | 1 | 21 |
| 1 | 1 | 0 | 1 | 0 | 0 | 22 |
| 0 | 1 | 1 | 0 | 1 | 0 | 23 |
| 1 | 0 | 1 | 1 | 0 | 1 | 24 |
| 1 | 1 | 0 | 1 | 1 | 0 | 25 |
| 0 | 1 | 1 | 0 | 1 | 1 | 26 |
| 0 | 0 | 1 | 1 | 0 | 1 | 27 |
| 0 | 0 | 0 | 1 | 1 | 0 | 28 |
| 1 | 0 | 0 | 0 | 1 | 1 | 29 |
| 1 | 1 | 0 | 0 | 0 | 1 | 30 |
| 1 | 1 | 1 | 0 | 0 | 0 | 31 |

It is apparent, therefore, that following the detection of a mark-to-space transition in a binary coded signal, successive binary counts are established at the output connections 25 of the six $n$-bit registers 22-1 . . . 22-6. It is to be noted, however, that these binary counts do not appear at the output connections 25 one immediately after the other. Due to the fact that the 32 input data lines of the $n$-bit multiplexer unit 3 are sampled in succession and the registers 22-1 . . . 22-6 (and also the registers 15-1 . . . 15-4) operate synchronously with the sampling of the input data lines, each of the binary counts produced at the output connections 25 of the $n$-bit shift registers 22-1 . . . 22-6 following the detection of a mark-to-space transition is separated from the next binary count for the same input data line by 32 clock pulse times. It is also to be noted that if, after the $n$-bit shift registers 22-1 . . . 22-6 have been operated to provide one or more binary counts following the detection of a mark-to-space transition, additional mark-to-space transitions are detected in binary coded signals on succeeding input data lines, the first stages of the $n$-bit shift registers 22-1 . . . 22-6 are, as before, reset to their "0" states following the detection of each of the succeeding transitions. Binary counts are then caused to be produced at the output connections 25 for the succeeding input data lines, in the same manner as described hereinabove. There is no confusion of the various sets of binary counts produced at the output connections 25 of the $n$-bit shift registers 22-1 . . . 22-6 inasmuch as the sets of binary counts occur in different time periods and are interleaved with respect to each other.

The various binary counts produced at the output connections 25 of the $n$-bit shift registers 22-1 . . . 22-6 are continuously examined by the center-of-bit detector 27 and by the end-of-bit detector 28 to detect binary counts representing the centers and ends, respectively, of bit periods. As stated previously, a binary count of 15 (0 0 0 1 0 0) following the detection of a mark-to-space transition is taken to represent the center of the bit period following the transition, and a binary count of 31 (1 1 1 0 0 0) following the detection of a mark-to-space transition is taken to represent the end of the bit period following the transition. (For other data baud rates, other counts are used to represent the center and end of a bit period.) When a binary count of 15 is detected by the center-of-bit detector 27, an output signal is produced thereby and applied to the AND gate 37, the AND gate 38, and to the OR gate 41. The AND gate 37 operates in response to the output signal produced by the center-of-bit detector 27 to cause a sampled signal, present at the output connection 19 of the $n$-bit shift register 15-2 and representing the value of the bit in the bit period following the detection of the mark-to-space transition, to be gated therethrough to the OR gate 39. The sampled signal, having a value of "0" or "1," is then entered via the OR gate 39 into the bit value $n$-bit shift register 9. As indicated in FIG. 2, this sampled signal represents the first sampled signal following a mark-to-space transition, or the third of a set of four sampled signals. At the same time as the sampled signal is entered into and stored in the bit value $n$-bit shift register 9, the output signal produced by the center-of-bit detector 27 is coupled via the OR gate 41 to the bit storage *n*-bit shift register 10. This signal, typically having a value of "1", is stored in the bit storage *n*-bit shift register 10 and serves to indicate that a corresponding sampled signal has been applied to and stored in the bit value *n*-bit shift register 9. As successive clock pulses are applied to the *n*-bit shift registers 9 and 10, the sampled signal stored in the bit value *n*-bit shift register 9 is caused to propagate down through the register 9 to the output thereof, and the associated signal stored in the bit storage *n*-bit shift register 10 is caused to propagate down through the register 10 to the output thereof. At such time as the signal present in the bit storage n-bit shift register 10 reaches the output thereof, it is detected by output data processing circuitry coupled thereto and the corresponding sampled signal at the output of the bit value *n*-bit shift register 9 is then collected by the output data processing circuitry. Other sampled signals derived from other binary coded signals, together with corresponding output signals produced by the center-of-bit detector 27, are also applied to and stored in the *n*-bit shift register 9 and 10, in the same manner as described hereinabove, and then processed by the output data processing circuitry. To insure that the output data processing circuitry has sufficient time to collect and process sampled signals received from the bit value *n*-bit shift register 9, the AND gate 38 is enabled by each output signal produced by the center-of-bit detector 27 whereby the sampled signals in the bit value *n*-bit shift register 9 are caused to recirculate between the output and input of the bit value *n*-bit shift register 9. The corresponding signals stored in the bit storage *n*-bit shift register 10 also recirculate at this time via the OR gate 41.

When a binary count of 31 (1 1 1 0 0 0) is detected by the end-of-bit detector 28, an output signal is produced thereby and coupled via the OR gate 35 and the gates 33 and 26 to the input stages of the six *n*-bit shift registers 22-1 . . . 22-6. As a result, the input stages are reset to their "0" states. Assuming that no new mark-to-space transition occurs in the binary coded signal following this resetting operation, the *n*-bit shift registers 22-1 . . . 22-6, the AND gates 30 and 31, the OR gate 33, and the gates 25 operate to initiate a new counting sequence, starting with 0 0 0 0 0 0 (reset state), for the next bit period. When a binary count of 15(0 0 0 1 0 0) is reached, it is detected by the center-of-bit detector 27 and a sampled signal representing the value of the bit in the next bit period of the binary coded signal is caused to be applied to and stored in the bit value *n*-bit shift register 9, in the same manner as described hereinbefore, and a corresponding signal indicating that the sampled signal has been applied to and stored in the bit value *n*-bit shift register 9 is caused to be applied to and stored in the bit storage *n*-bit shift register 10.

MODIFICATIONS

Although a specific embodiment of the invention has been described hereinabove, it will be apparent to those skilled in the art that various changes and modifications may be made therein. For example, a greater or lesser number of *n*-bit shift registers 15-1 . . . 15-4 may be used in the sample storage and transition detector circuit 7 depending on the degree of accuracy desired to be achieved in detecting mark-to-space transitions. Also space-to-mark transition, rather than mark-to-space transitions, may be used to synchronize the operation of the counting elements provided in the counter center-pulse sampling circuit 8 of FIG. 1. In addition, a binary counting mode of operation may be established for the counter center-pulse sampling circuit 8 using the output of the first *n*-bit shift register 22-1 and the output of an *n*-bit shift register other than the last *n*-bit shift register 22-6. Other changes and modifications will be apparent to those skilled in the art without departing from the invention as called for in the appended claims.

What is claimed is:

1. A data sampling apparatus, comprising:

first means having a plurality of input connections for receiving a plurality of binary coded signals comprising bits in corresponding bit periods, each bit having a first value or a second value, said first means being operative to sample the bits in the bit periods of the plurality of binary coded signals received at its input connections thereby to derive sampled signals, each having a first value or a second value, and to produce a transition output signal for each transition in each binary coded signal from one of its bit values to the other of its bit values;

counting means coupled to the first means and operative in response to a transition output signal produced by the first means to count through a predetermined sequence of counts, said counting means comprising:

a. a plurality of shift register means each having an input connection and an output connection, the input connection of the first one of the plurality of shift register means being coupled to the first means, and the output connection of each of the plurality of shift register means, with the exception of the last one of the plurality of shift register means, being coupled to the input connection of the next shift register means; and b. logic means coupled to the plurality of shift register means and to the first means and operative when a transition output signal is produced by the first means to establish a counting mode of operation for the plurality of shift register means whereby successive combinations of output signals, corresponding to the samples of the bit present in the bit period following the transition for which the transition output signal is produced by the first means, are caused to be established at the output connections of the plurality of shift register means, said combinations of output signals representing different counts, one of said counts representing a particular point in each bit period following a transition for which a transition output signal is produced by the first means;

detector means coupled to the output connections of the plurality of shift register means and adapted to examine the counts established at the output connections of the plurality of shift register means, said detector means being operative in response to detecting a count representing the aforesaid particular point in a bit period following a transition for which a transition output signal is produced by the first means to produce a corresponding output signal; and output means coupled to the detector means and to the first means, said output means being operative in response to an output signal produced by the detector means corresponding to a count representing the aforesaid point in a bit period to receive and store a sampled signal from the first means representing the value of the bit in said bit period.

2. A data sampling apparatus in accordance with claim 1 wherein:

the logic means includes an exclusive-or logic arrangement.

3. A data sampling apparatus in accordance with claim 1 wherein:

the logic means includes:

a positive AND gate and a negative AND gate, each having first and second input connections coupled, respectively, to the output connection of the first one of the plurality of shift register means and to the output connection of another one of the plurality of shift register means, and each having an output connection; and a gate coupled to the output connections of the positive and negative AND gates and to the input connection of the first one of the plurality of shift register means.

4. A data sampling apparatus in accordance with claim 3 wherein:

said another one of the plurality of shift register means is the last one of the plurality of shift register means.

5. A data sampling apparatus in accordance with claim 1 wherein:

the detector means is operative to produce an output signal in response to detecting a count representing the center of a bit period following a transition for which a transition output signal is produced by the first means.

6. A data sampling apparatus in accordance with claim 1 wherein:

said plurality of shift register means comprise stages;

another one of the counts established at the output connections of the plurality of shift register means represents a second point in each bit period following a transition for which a transition output signal is produced by the first means; and said data sampling apparatus further comprises:

second detector means coupled to the output connections of the plurality of shift register means and adapted to examine the counts established at the output connections of the plurality of shift register means, said second detector means being operative in response to detecting a count representing said another point in a bit period following a transition for which a transition output signal is produced by the first means to produce a corresponding output signal; and means coupled to the second detector means and to the input connections of the plurality of shift register means and operative in response to each output signal produced by the second detector means to reset the first stages of said plurality of shift register means.

7. A data sampling apparatus in accordance with claim 6 wherein:

the second detector means is operative to produce an output signal in response to detecting a count representing the end of a bit period following a transition for which an output signal is produced by the first means.

8. A data sampling apparatus in accordance with claim 1 wherein the output means comprises:

a bit value shift register means for receiving and storing each sampled signal from the first means in response to an output signal being produced by the detector means.

9. A data sampling apparatus in accordance with claim 8, further comprising:

a bit storage shift register means operative to receive and store each output signal produced by the first detector means synchronous with each sampled signal received and stored by the bit value shift register means.

10. A data sampling apparatus, comprising:

sampling means having a plurality of input connections for receiving a plurality of binary coded signals comprising bits in corresponding bit periods, each bit having a first value or a second value, and further having an output connection means, said sampling means being operative to sample the bits in the bit periods of the plurality of binary coded signals received at its input connections and to apply the sampled signals, each having a first bit value or a second bit value, to its output connection means;

sample storage means coupled to the output connection means of the sampling means and operative to receive and store therein the sampled signals applied to the output connection means of the sampling means;

first detector means coupled to the sample storage means and adapted to examine the sampled signals applied to and stored in the sample storage means, said first detector means being operative in response to detecting a particular combination of sampled signals stored by the sample storage means indicating the occurrence of a transition in one of the binary coded signals from one of its bit values to the other of its bit values to produce a transition output signal;

counting means coupled to the first detector means and operative in response to a transition output signal produced by the first detector means to count through a predetermined sequence of counts, said counting means comprising:

a. a plurality of shift register means each having an input connection and an output connection, the input connection of the first one of the plurality of shift register means being coupled to the first detector means, and the output connection of the plurality of shift register means, with the exception of the last one of the plurality of shift register means, being coupled to the input connection of the next shift register means; and b. logic means coupled to the plurality of shift register means and to the first detector means and operative when a transition output signal is produced by the first detector means to establish a counting mode of operation for the plurality of shift register means whereby successive combinations of output signals, corresponding to the samples of the bit present in the bit period following the transition for which the transition output signal is produced by the first means, are caused to be established at the output connections of the plurality of shift register means, said combinations of output signals representing different counts, one of said counts representing the center of each bit period following a transition for which a transition output signal is produced by the first detector means;

second detector means coupled to the output connections of the plurality of shift register means and adapted to examine the counts established at the output connections of the plurality of shift register means, said second detector means being operative in response to detecting a count representing the center of a bit period following a transition for which a transition output signal is produced by the first detector means to produce a corresponding output signal; and output means coupled to the second detector means and to the sample storage means, said output means being operative in response to an output signal produced by the second detector means corresponding to a count representing the center of a bit period to receive a sampled signal from the sample storage means representing the value of the bit in said bit period.

11. A data sampling apparatus in accordance with claim 10 wherein:

each of the bits in each bit period of each of the binary coded signals has a bit value of zero or one;

each of the sampled signals derived by the sampling means and stored by the sample storage means has a bit value of zero or one; and the first detector means is operative to produce a transition output signal in response to detecting a particular combination of sampled signals having particular values stored by the sample storage means and indicating the occurrence of a transition in one of the binary coded signals from its one value to its zero value.

12. A data sampling apparatus in accordance with claim 10 wherein:

the logic means includes an exclusive-or arrangement.

13. A data sampling apparatus in accordance with claim 10 wherein:

the logic means includes:

a positive AND gate and a negative AND gate, each having first and second input connections coupled, respectively, to the output connection of the first one of the plurality of shift register means and to the output connection of another one of the plurality of shift register means, and each having an output connection; and a gate coupled to the output connections of the positive and negative AND gates and to the input connection of the first one of the plurality of shift register means.

14. A data sampling apparatus in accordance with claim 13 wherein:

said another one of the plurality of shift register means is the last one of the plurality of shift register means.

15. A data sampling apparatus in accordance with claim 10 wherein:

said plurality of shift register means comprise stages;

another one of the counts established at the output connections of the plurality of shift register means represents the end of each bit period following a transition for which a transition output signal is produced by the first detector means; and said data sampling apparatus further comprises:

third detector means coupled to the output connections of the plurality of shift register means and adapted to examine the counts established at the output connections of the plurality of shift register means, said third detector means being operative in response to detecting a count representing the end of a bit period following a transition for which a transition output signal is produced by the first detector means to produce a corresponding output signal; and means coupled to the third detector means and to the input connections of the plurality of shift register means and operative in response to each output signal produced by the third detector means to reset the first stages of said plurality of shift register means.

16. A data sampling apparatus, comprising:

sampling means having $n$-input connections for receiving $n$-binary coded signals comprising bits in corresponding bit periods, and further having an output connection, said sampling means being operative to repetitively sample the $n$-binary coded signals received at its input connections in succession, and to apply the sampled signals, each having a first bit value or a second bit value, to its output connection;

a plurality of shift register means each having $n$-stages and each having an input connection and an output connection, the input connection of the first one of the plurality of shift register means being coupled to the output connection of the sampling means, and the output connection of each of the plurality of shift register means, with the exception of the last one of the plurality of shift register means being coupled to the input connection of the next shift register means;

clock means coupled to the plurality of shift register means and operative to clock the plurality of shift register means whereby the sampled signals applied to the output connection of the sampling means are clocked into and along the plurality of shift register means, synchronous with the sampling of the binary coded signals by the sampling means, and whereby a set of the most recent sampled signals derived from each of the binary coded signals is caused to be stored in sets of parallel stages of the plurality of shift register means and to be clocked to the output connections of the plurality of shift register means, the number of sampled signals in each set being equal to the number of shift register means in the plurality of shift register means;

first detector means coupled to the output connections of the plurality of shift register means and adapted to examine the sets of sampled signals clocked to the output connections of the plurality of shift register means, and first detector means being operative in response to detecting a particular set of sampled signals having particular values at the output connections of the plurality of shift register means indicating the occurrence of a transition in one of the binary coded signals from one of its bit values to the other of its bit values to produce a transition output signal;

counting means coupled to the first detector means and having a plurality of output connections, said counting means being operative in response to a transition output signal produced by the first detector means to establish at its output connections successive combinations of output signals corresponding to the samples of the bit present in the bit period following the transition for which the transition output signal is produced by the first detector means, said combinations of output signals representing different counts, one of said counts representing a particular point in each bit period following a transition for which a transition output signal is produced by the first detector means;

second detector means coupled to the output connections of the counting means and adapted to examine the counts established at the output connections of the counting means, said second detector means being operative in response to detecting a count representing the aforesaid particular point in a bit period following a transition for which a transition output signal is produced by the first detector means to produce a corresponding output signal; and output means coupled to the second detector means and to the output connection of a predetermined one of the plurality of shift register means, said output means being operative in response to an output signal produced by the second detector means corresponding to a count representing the aforesaid point in a bit period to receive the sampled signal at the output connection of the aforesaid shift register means, said sampled signal representing the value of the bit in said bit period.

17. A data sampling apparatus in accordance with claim 16 wherein:

the counter means comprises:

a. a second plurality of shift register means, each having n stages and each having an input connection and an output connection, the input connection of the first one of the second plurality of shift register means being coupled to the first detector means, and the output connection of each of the second plurality of shift register means, with the exception of the last one of the second plurality of shift register means, being coupled to the input connection of the next shift register means; and b. logic means coupled to the second plurality of shift register means and to the first detector means and operative when a transition output signal is produced by the first detector means to establish a counting mode of operation for the second plurality of shift register means whereby successive combinations of output signals are caused to be established at the output connections of the second plurality of of shift register means, said combinations representing different counts.

18. A data sampling apparatus in accordance with claim 17 wherein:

the logic means includes an exclusive-or logic arrangement.

19. A data sampling apparatus in accordance with claim 18 wherein:

the second detector means is coupled to the output connections of the second plurality of shift register means and is operative to produce an output signal in response to detecting a count established at the output connections representing the center of a bit period following a transition for which a transition output signal is produced by the first detector means.

20. A data sampling apparatus in accordance with claim 19 wherein:

another one of the counts established at the output connections of the second plurality of shift register means represents the end of each bit period following a transition for which a transition output signal is produced by the first detector means; and said data sampling apparatus further comprises:

third detector means coupled to the output connections of the second plurality of shift register means and adapted to examine the counts established at the output connections of the second plurality of shift register means, said third detector means being operative in response to detecting a count representing said end of a bit period following a transition for which a transition output signal is produced by the first detector means to produce a corresponding output signal; and means coupled to the third detector means and to the input connections of the second plurality of shift register means and operative in response to each output signal produced by the third detector means to reset the first stages of said second plurality of shift register means.

* * * * *